(12) United States Patent
Sorg et al.

(10) Patent No.: US 12,536,763 B2
(45) Date of Patent: Jan. 27, 2026

(54) ARTIFICIAL REALITY WEIGHT SIMULATION FOR A VIRTUAL OBJECT

(71) Applicant: Meta Platforms Technologies, LLC, Menlo Park, CA (US)

(72) Inventors: Brandon Jacob Sorg, San Francisco, CA (US); Zhenyu Xu, Fremont, CA (US); Martin Schubert, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 141 days.

(21) Appl. No.: 18/535,399

(22) Filed: Dec. 11, 2023

(65) Prior Publication Data
US 2024/0212302 A1    Jun. 27, 2024

Related U.S. Application Data

(60) Provisional application No. 63/476,413, filed on Dec. 21, 2022.

(51) Int. Cl.
*G06T 19/00* (2011.01)
*G06T 19/20* (2011.01)

(52) U.S. Cl.
CPC ...... *G06T 19/20* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 2009/0099824 A1* | 4/2009 | Falash | H04L 67/131 703/8 |
| 2010/0013761 A1* | 1/2010 | Birnbaum | G06F 3/016 340/407.1 |

(Continued)

OTHER PUBLICATIONS

Deck C., "Why Throwing in VR Sucks—and How to Make it Better," Game Developer [Online], Nov. 18, 2016 [Retrieved on Jan. 5, 2019], pp. 1-11, Retrieved from the Internet: URL: https://www.gamasutra.com/blogs/CharlieDeck/20161118/285808/Why_Throwing_in_VR_Sucks and_How_to_Make_it_Better.php.

(Continued)

*Primary Examiner* — Martin Mushambo
(74) *Attorney, Agent, or Firm* — Potomac Law Group, PLLC; Dannon G. Allbee

(57) ABSTRACT

Aspects of the present disclosure are directed to simulating weight for a virtual object in artificial reality. Implementations of a weight simulator can simulate weight for a virtual object during interactions with a user in an artificial reality environment. For example, when a user picks up a virtual object with simulated weight, a spring dynamics model may take, as input, the user movement (e.g., had movement while grasping the virtual object) and control the virtual object movement using outputs from the spring dynamics model. The spring dynamics model's control of the virtual object's movement can give the appearance of lag relative to the user's movements. For example, the user may pick up and move the virtual object, and the virtual object may lag (e.g., behind and/or in a rotation) relative the user's hand movements, as if the user's hand and virtual object were connected by one or more virtual springs.

20 Claims, 11 Drawing Sheets

(56) References Cited

U.S. PATENT DOCUMENTS

2013/0307875 A1* 11/2013 Anderson ............... A63F 13/92
                                                        345/633
2017/0160807 A1*  6/2017 Keller .................... G06F 3/014

OTHER PUBLICATIONS

Khosravi H., et al., "Simulating Mass in Virtual Reality using Physically-Based Hand-Object Interactions with Vibration Feedback," Proceedings of Graphics Interface 2021, May 28, 2021, 8 pages.

Reel B., "Simulating Weight in VR" Medium, Jul. 20, 2016, 8 pages.

Wang X., et al., "Vibro Weight: Simulating Weight and Center of Gravity Changes of Objects in Virtual Reality for Enhanced Realism," 2022 IEEE Haptics Symposium (HAPTICS), Mar. 21, 2022, 7 pages.

Ye X., et al., "A Survey on Simulation for Weight Perception in Virtual Reality," Journal of Computer and Communications, Sep. 2021, vol. 09, 24 pages.

Zenner A., et al., "Shifty: A Weight-Shifting Dynamic Passive Haptic Proxy to Enhance Object Perception in Virtual Reality," IEEE Transactions on Visualization and Computer Graphics, Apr. 2017, pp. 1312-1321.

* cited by examiner

ARTIFICIAL REALITY WEIGHT SIMULATION FOR A VIRTUAL OBJECT

CROSS-REFERENCE TO RELATED APPLICATION(S)

This application claims priority to U.S. Patent Provisional Application No. 63/476,413, titled "Artificial Reality Weight Simulation for a Virtual Object;" filed on Dec. 21, 2022 and which is herein incorporated by reference in its entirety.

TECHNICAL FIELD

The present disclosure is directed to a weight simulator that simulates weight for a virtual object in artificial reality.

BACKGROUND

Artificial reality systems have grown in popularity with users, and this growth is predicted to accelerate. Some artificial reality environments include virtual object displays. However, conventional virtual object implementations can lack realistic detail. For example, user (e.g., avatar, virtual self-presence, etc.) interactions with a virtual object in an artificial reality environment can lack certain intuitive elements that are part of real-life interactions with real-world objects, such as the effect that an object's weight has on the interaction. Artificial reality systems have begun to incorporate realistic elements to these interactions, but the user experience continues to lack an intuitive feel.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
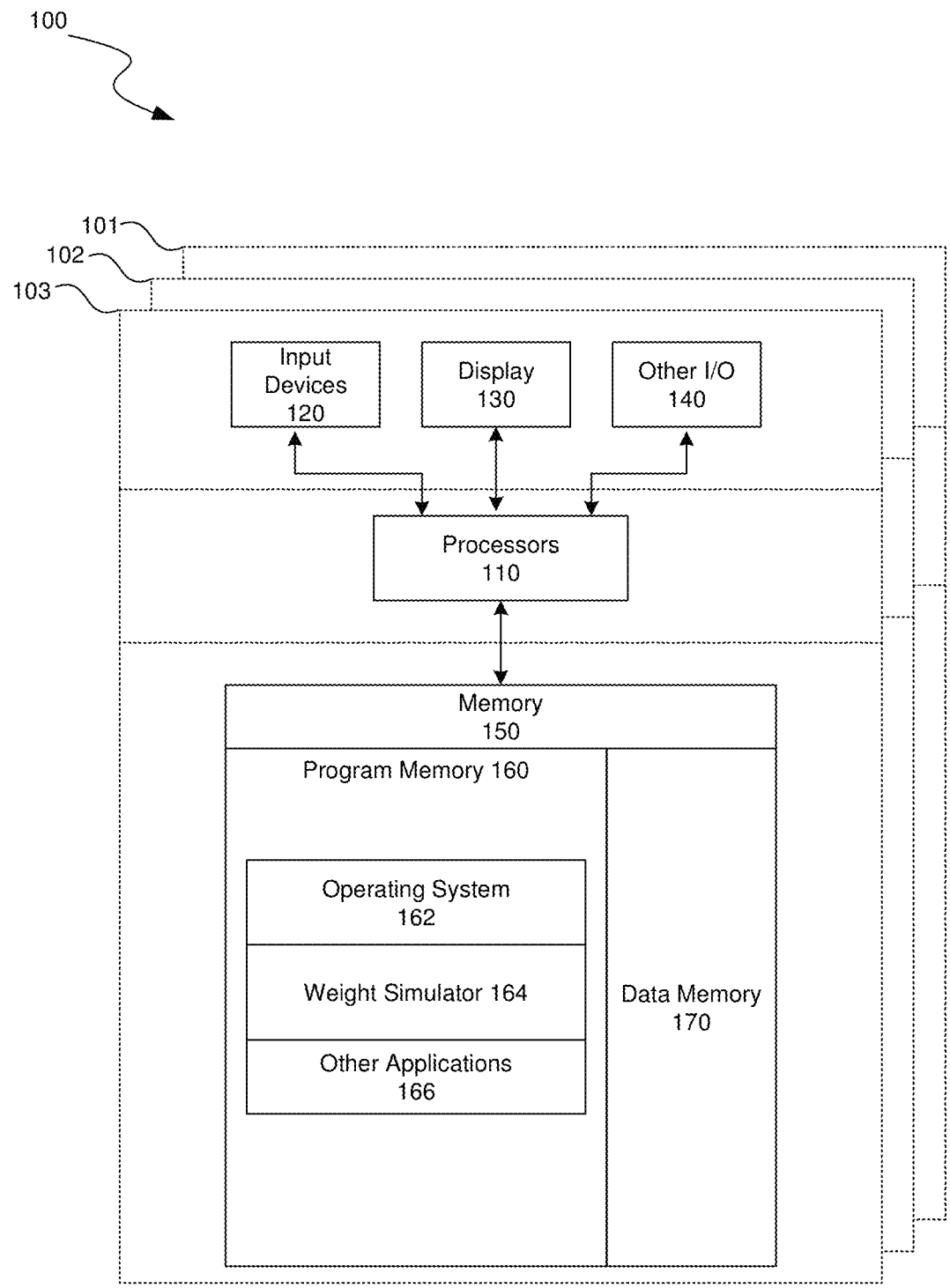
FIG. 1 is a block diagram illustrating an overview of devices on which some implementations of the present technology can operate.

Aspects of the present disclosure are directed to simulating weight for a virtual object in artificial reality. Implementations of a weight simulator can simulate weight for a virtual object during interactions with a user in an artificial reality environment. For example, when a user picks up a virtual object with simulated weight, a spring dynamics model may take, as input, the user movement (e.g., had movement while grasping the virtual object) and control the virtual object movement using outputs from the spring dynamics model. The spring dynamics model's control of the virtual object's movement can give the appearance of lag relative to the user's movements. For example, the user may pick up and move the virtual object, and the virtual object may lag (e.g., behind and below) the user's hand movements as if the user's hand and virtual object were connected by a virtual spring.

In some implementations, multiple virtual spring models can be defined for a virtual object, the first model controlling movement of the virtual object and the second model controlling rotation of the virtual object. Similar to the lag for virtual object movement, the second virtual spring model may control the virtual object's rotation in a manner that lags behind a user's hand rotation. For example, force components from multiple conceptual springs can aggregate to an overall simulated force applied to the virtual object by movement of the user's hand. In some implementations, the force components can include a position component applied on the virtual object by a position conceptual spring and a rotation component applied on the virtual object by a rotation conceptual spring (e.g., a coil spring). Implementations of the position conceptual spring can simulate the force applied on the virtual object that defines its position in a three-dimensional environment. Implementations of the rotation conceptual spring (e.g., coil spring) can simulate the force applied on the virtual object that defines its rotational state in the three-dimensional environment. For example, the rotation conceptual spring can take, as input, rotational movement of the user's hand and simulate rotational force on the virtual object.

In some implementations, the spring dynamics model can simulate a force on the virtual object according to a center of gravity for the virtual object and the position/movement of the user's hand relative to this center of gravity. For example, a larger force simulation is calculated in response to user hand movement that moves a greater distance from the virtual object center of mass (e.g., stretches the position conceptual spring further) and a smaller force simulation is calculated in response to user hand movement that moves a smaller distance from the virtual object center of mass. Other examples of the simulation profile can calculate the force applied to the virtual object according to any suitable point(s) of the virtual object and/or user hand. Implementations of the simulation profile can modify an object's center of mass (e.g., relative point used for force calculation). For example, the modified center of mass may generate a more expected movement/applied force in response to user movement. The modified center of mass may be based on the shape of the virtual object, the virtual weight of the virtual object, or any other suitable factors.

Implementations can tune parameters of the simulation profile to simulate weight for virtual objects with different shapes, sizes, weights, and the like. Tunable parameters include spring coefficient(s), damper force(s), virtual weight(s), and center of mass location(s). By varying the tuning parameters, simulation profile(s) can simulate force dynamics for virtual objects of different sizes, shapes, weight, etc. to vary the user experience. For example, different virtual objects can be simulated to feel similar to one another, similar virtual objects can be simulated to feel different from one another, or any other suitable simulation can be achieved.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Several implementations are discussed below in more detail in reference to the figures. FIG. 1 is a block diagram illustrating an overview of devices on which some implementations of the disclosed technology can operate. The devices can comprise hardware components of a computing system 100 that simulates weight for a virtual object in artificial reality. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, weight simulator 164, and other application programs 166. Memory 150 can also include data memory 170 that can include, e.g., weight simulation model, spring dynamics model, virtual object information, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
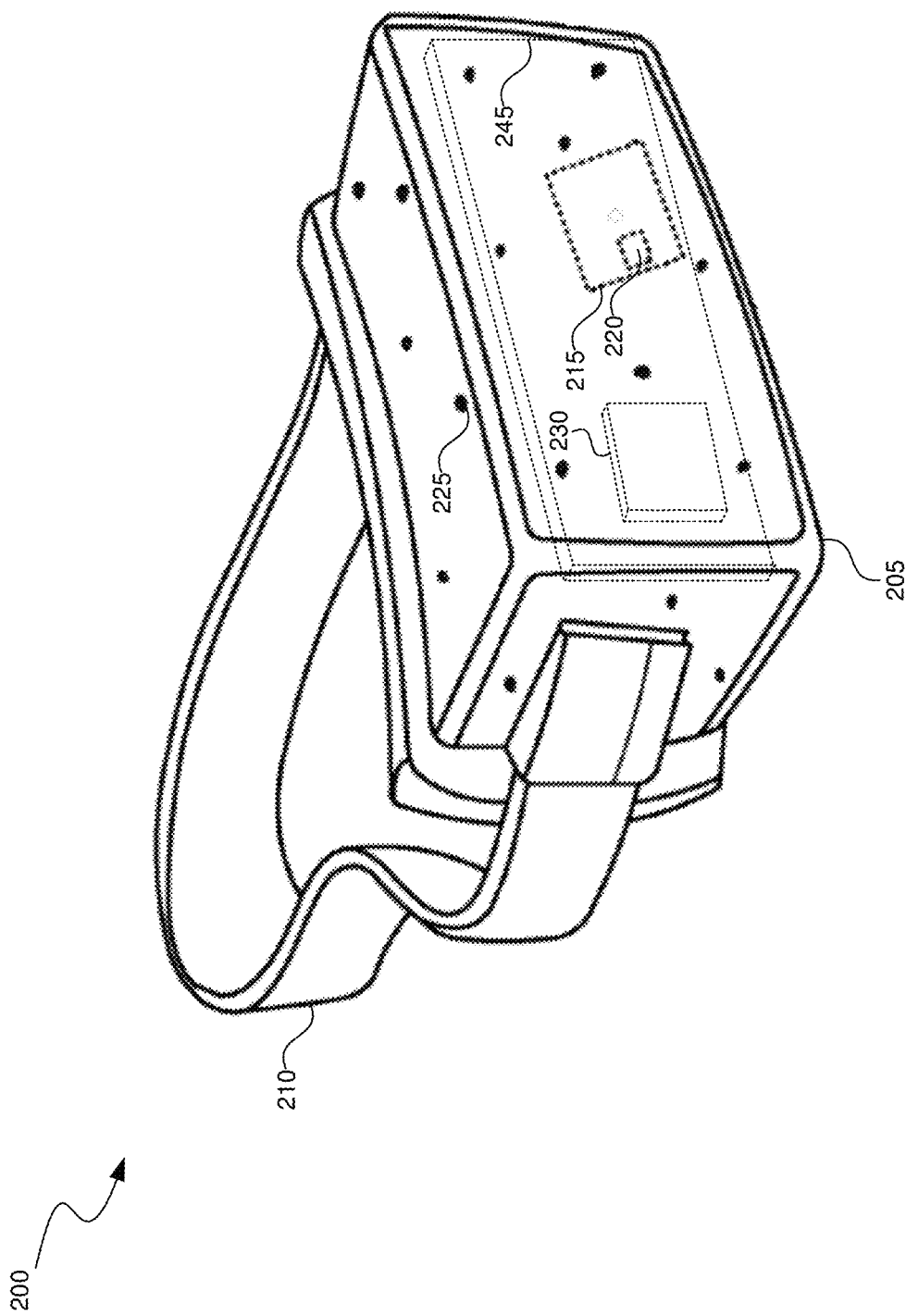
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
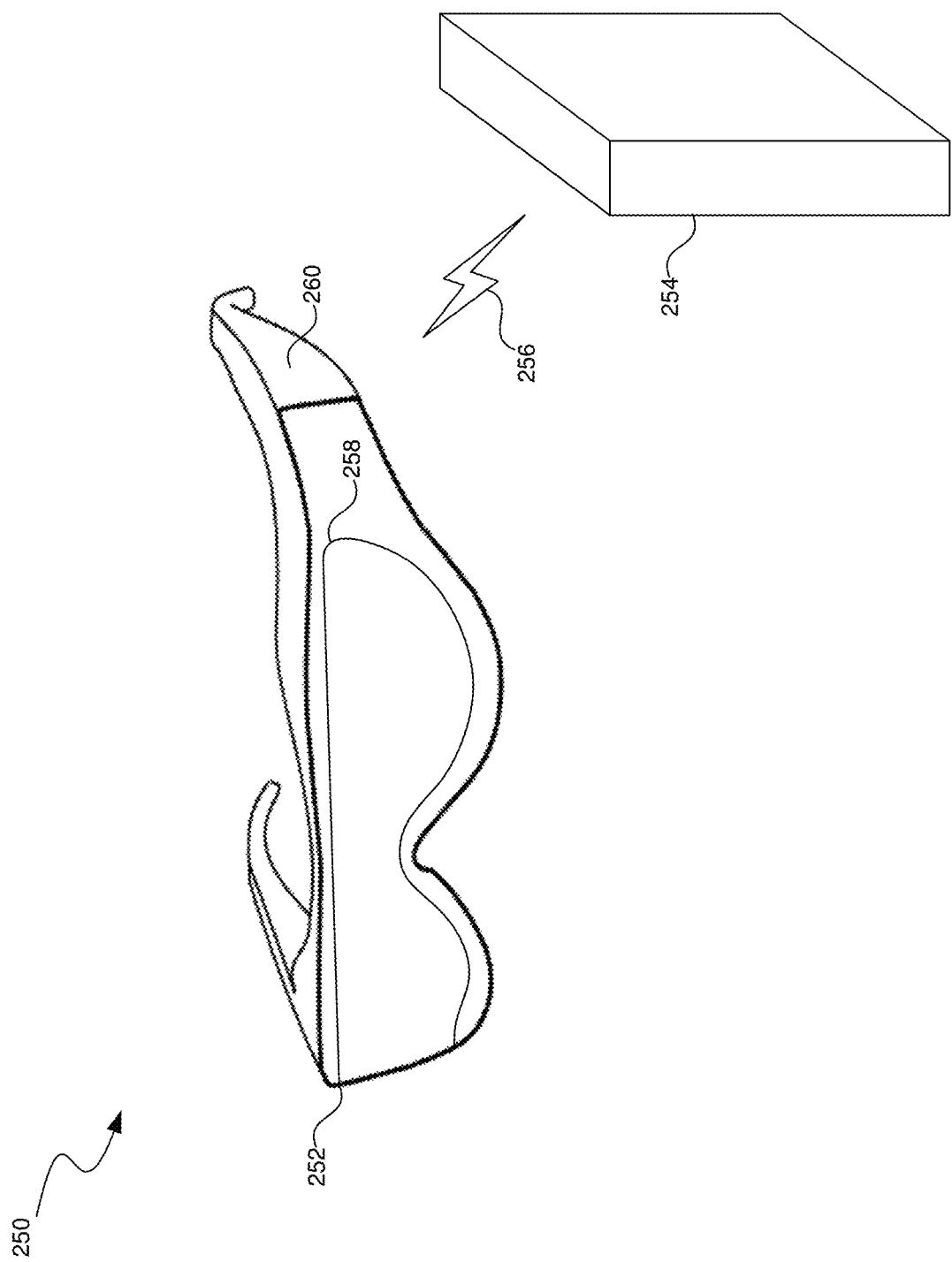
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
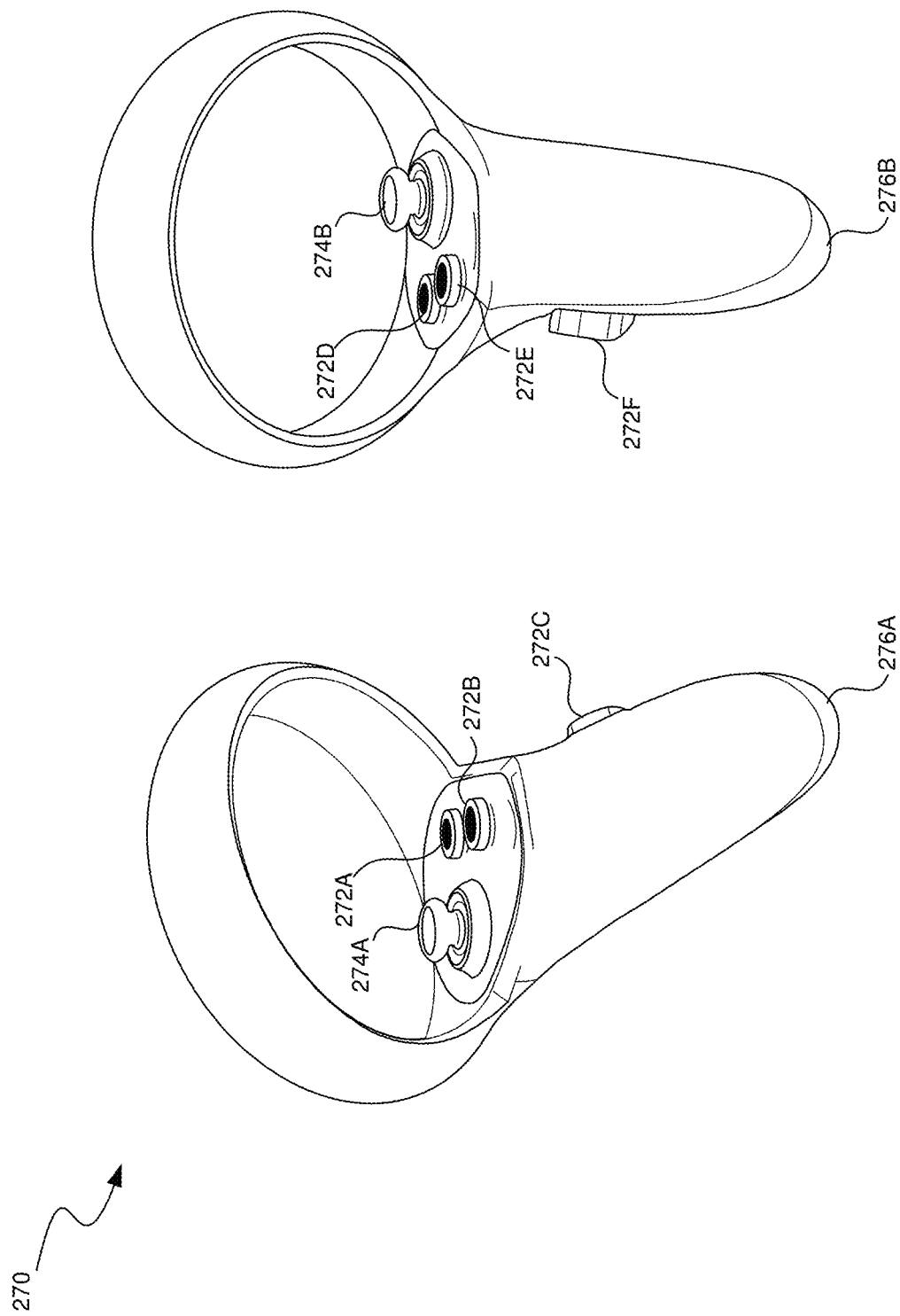
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
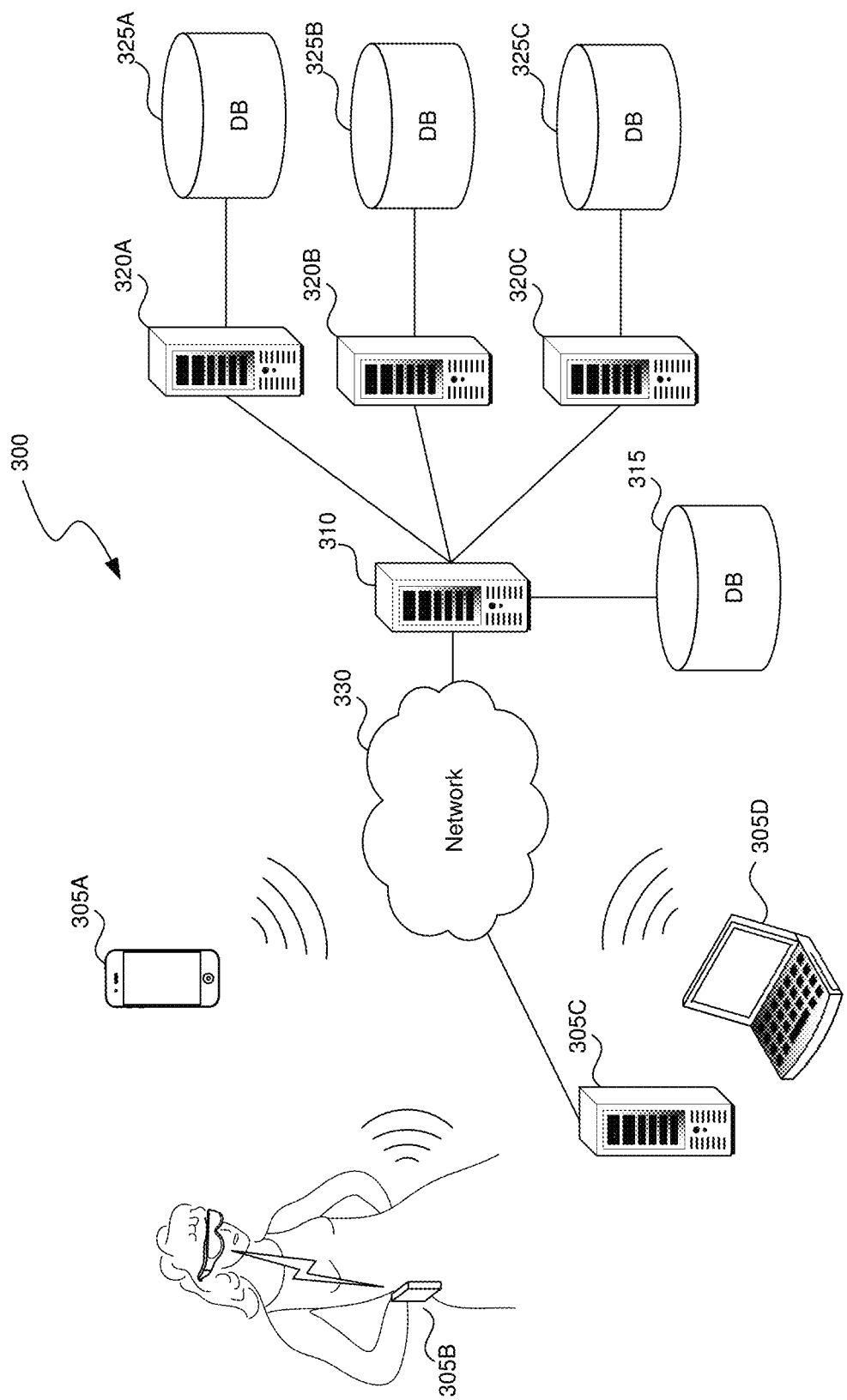
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
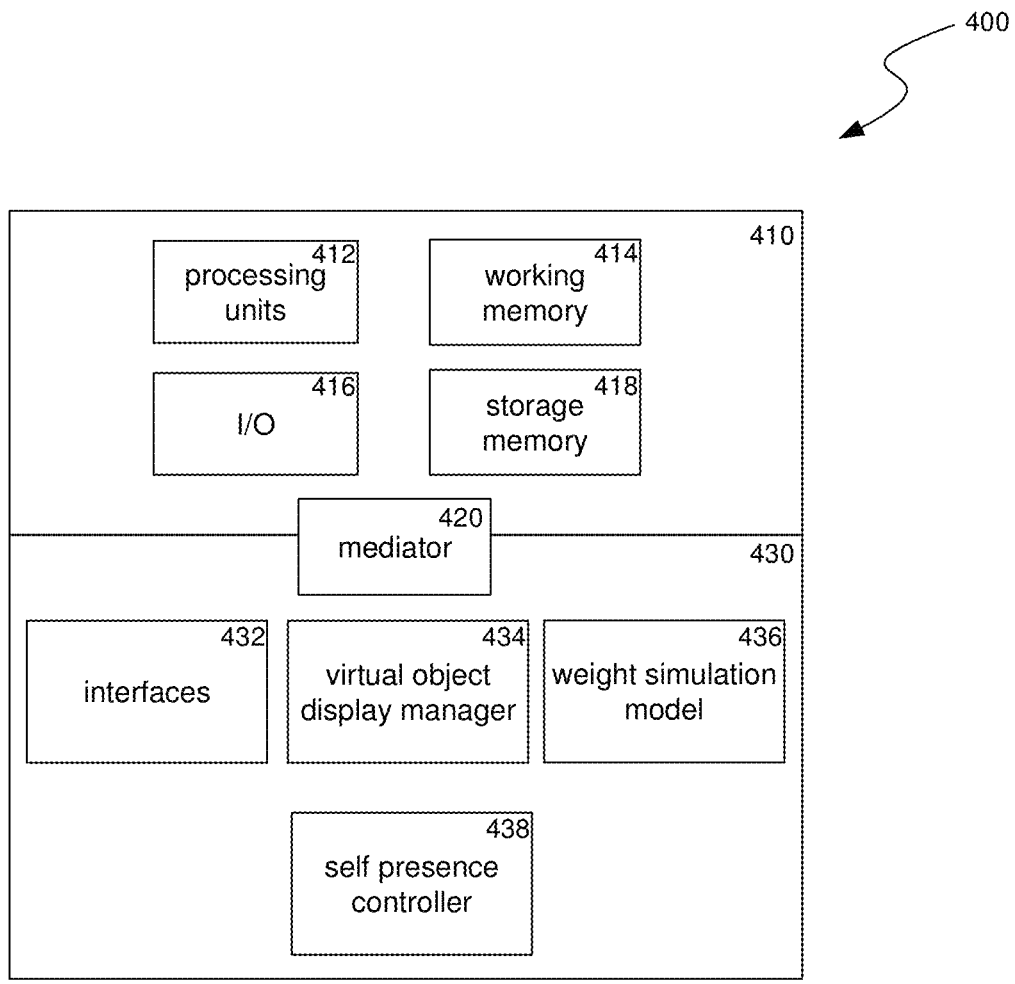
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for simulating weight for a virtual object in artificial reality. Specialized components 430 can include virtual object display manager 434, weight simulation model 436, and self-presence controller 438, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Virtual object display manager 434 can control the display of virtual object(s) in an XR environment with simulated weight. A user can interact with a virtual object with simulated weight (e.g., pick up the virtual object with a hand and move the hand) and virtual object display manager 434 can resolve the display parameters (e.g., location, orientation, etc.) for the virtual object based on the user interactions. In an example, weight simulation model 436 can include a spring dynamics model that outputs a force on the virtual object given the user interaction with the virtual object. Virtual object display manager 434 can resolve the display parameters for the virtual object using the force output by weight simulation model 436. Additional details on virtual object display manager 434 are provided below in relation to FIGS. 5, 6A, 6B, and 6C and blocks 702 and 708 of FIG. 7.

Weight simulation model 436 can simulate the dynamics (e.g., force) applied to a virtual object with simulated weight based on interactions in an XR environment. For example, a user can interact with a virtual object with simulated weight, such as grasp the virtual object with a hand of the user (e.g., hand of a user self-presence) and move the hand grasping the virtual object. Weight simulation model 436 can take, as input, the motion parameters (e.g., velocity, orientation, rotation, location, etc.) of the user hand grasping the virtual object and output a force applied on the virtual object by the user hand. For example, weight simulation model 436 can include a spring dynamics model that simulates a weight for the virtual object by applying force on the virtual object as though the user hand were affixed to the virtual object by one or more springs. Weight simulation model 436 can output the force applied on the virtual object to virtual object display manager 434, which can control the display of the virtual object. The resultant motion of the virtual object with simulated weight can lag (e.g., behind and/or below) the user hand motion. Additional details on virtual object display manager 434 are provided below in relation to FIGS. 5, 6A, 6B, and 6C and blocks 704 and 706 of FIG. 7.

Self-presence controller 438 can manage the movements and display of a user self-presence, such as an avatar or a virtual version of the user (e.g., virtual hands, arms, limbs, body, etc.). An XR system can capture user movements, such as user hand/arm movements, and self-presence controller 438 can move the user self-presence according to the captured user movements. Implementations of self-presence controller 438 provide weight simulation model 436 with information related to the user self-presence movements (e.g., hand/arm movement), such as velocity, orientation, rotation, location, and the like. Weight simulation model 436 and virtual object display manager 434 can resolve virtual object display parameters (e.g., movement, location, orientation, etc.) using the user self-presence movements.

Figure 5:
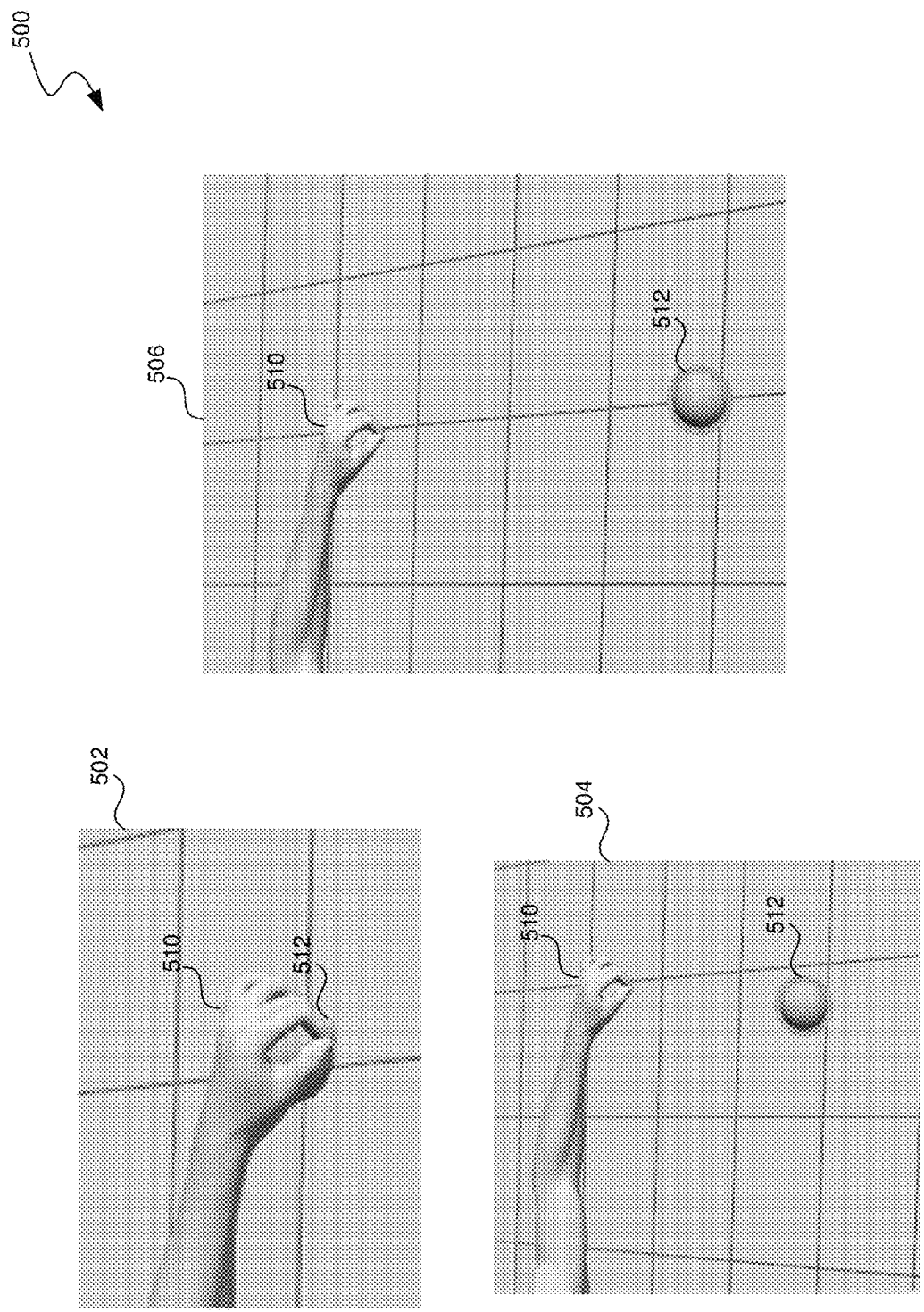
FIG. 5 is an artificial reality diagram that depicts user interactions with a virtual object.

Implementations of an XR system display, to a user, an XR environment that includes a self-presence for the user and a virtual object with a simulated weight. FIG. 5 is an artificial reality diagram that depicts user interactions with a virtual object. Diagram 500 includes displays 502, 504, and 506, user hand 510, and virtual object 512. Displays 502, 504, and 506 can represent XR environment displays at different points in times while a user interacts with a virtual object. For example, user hand 510 can be a portion of a virtual presence of the user in the XR environment, such as an avatar or other suitable virtual presence.

A user of the XR system can provide input via any suitable input channel(s) to interact with virtual object 512. Example XR input includes hand-held controller input (e.g., motion sensed input, button presses, joystick, etc.), sensed user movement (e.g., virtual hands, gestures, etc.), tracked user lower arm position (e.g., ray cast from user wrist and hand positioning), tracked user gaze (e.g., eye gaze, head gaze, etc.), and other suitable XR input. In the example illustrated in FIG. 5, user hand 510 can represent the user's virtual hand(s) tracked via user hand tracking. Virtual user hands can be a virtual representation of the user's hands in a XR environment that can directly interact with XR environment elements, such as virtual objects.

Some virtual object interactions can also include a ray-based component, such as an interaction that includes a ray projection (e.g., straight or curved line) from a control point (e.g., with respect to the user's tracked body) along a casting direction. For example, the control point can be a palm, fingertips, a fist, a wrist, etc., and the casting direction can be along a line that passes through the control point and an origin point, such as a shoulder, eye, or hip. In other implementations, the control point can be based on other tracked body parts such as a user's eye, head, or chest. For example, the control point can be an estimated position of a center of a user's pupil and the origin point can be an estimated position of the center of a user's retina. In some cases, a graphical representation of the ray projection (the whole line or just a point where the ray hits an object) can be displayed in the artificial reality environment, while in other cases the ray projection is tracked by the XR system without displaying the ray projection. In various implementations, the ray projection can extend from the control point until it intersects with a first object or the ray projection can extend through multiple objects.

In some implementations, ray-based interactions can include a ray projection component and one or more additional input components. For example, the ray projection can control user self-presence location within the XR environment (e.g., a location of user hand 510) and one or more additional input components can control additional actions (e.g., grasping, rotation, ungrasping, etc.). The additional input components can comprise tracked user gestures (e.g., grasping, ungrasping, snapping, pinching, rotation, etc.), button presses and/or joystick input on a hand-held controller, and other suitable XR device input.

Implementations can simulate a weight for virtual object 512 by using a weight simulation profile. For example, when user hand 510 moves while grasping virtual object 512, virtual object 512's movement can lag user hand 510's movement. Display 502 depicts user hand 510 grasping virtual object 512, display 504 depicts user hand 510 moving a first distance while grasping virtual object 512, and display 506 depicts user hand 510 moving a second distance while grasping virtual object 512. Displays 502, 504, and 506 can be time sequenced displays that represent a motion of user hand 510 while grasping virtual object 512. For example, the motion of user hand 510 can move further from virtual object 512 as time progresses. Movement from virtual object 512 may be delayed relative to movement of user hand 510 and/or virtual object 512 may stay stationary in response to the movement of user hand 510.

In some implementations, the weight simulation profile can simulate a force applied to virtual object 512 by user hand 510. In the illustrated example, the force applied to virtual object 512 can be delayed in time relative to the movement of user hand 510. In some implementations, the weight simulation profile comprises a spring dynamics model. For example, the spring dynamics model can calculate a force that user hand 510 applies to virtual object 512 as though a spring were affixed to each of them. The weight simulation of virtual object 512 can be implemented via any other suitable dynamics model that calculates a lag in the movement of virtual object 512 relative to the movement of user hand 510.

Figure 6A:
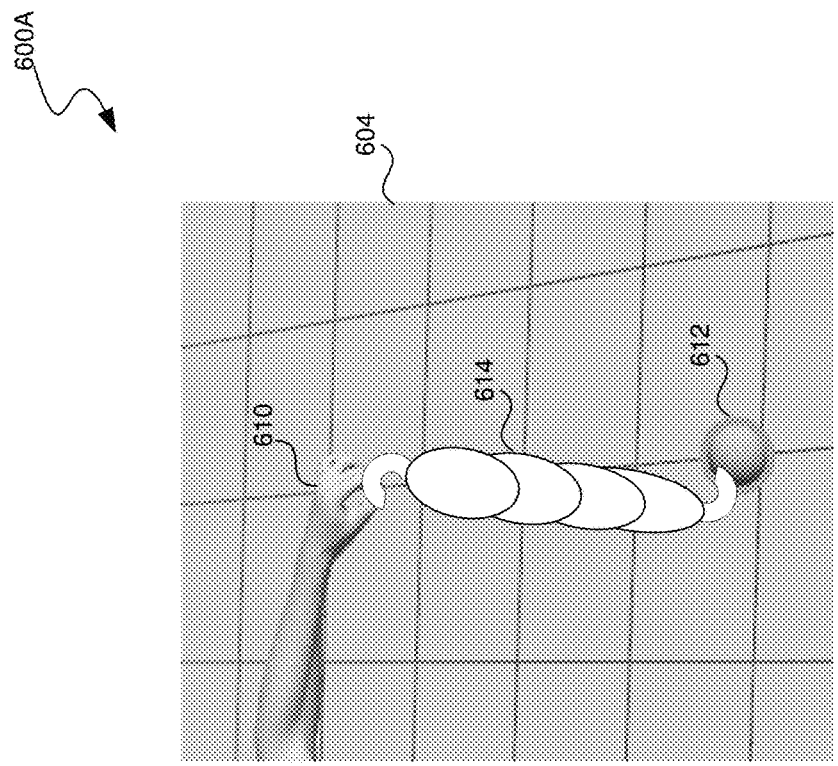
FIGS. 6A, 6B, and 6C are artificial reality diagrams that depict user interactions with a virtual object according to a weight simulation profile for the virtual object.
Figure 6A:
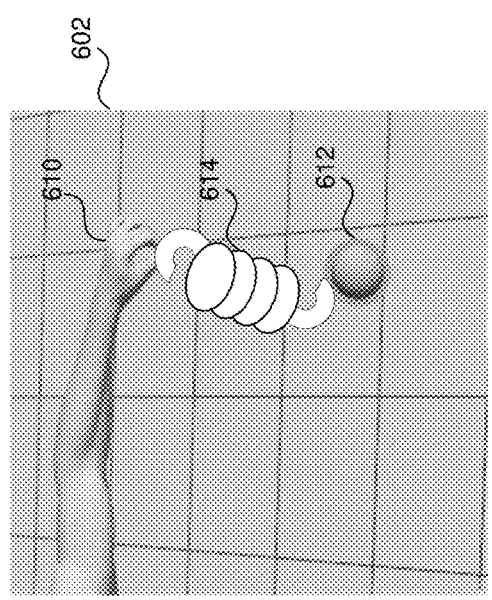
Figure 6B:
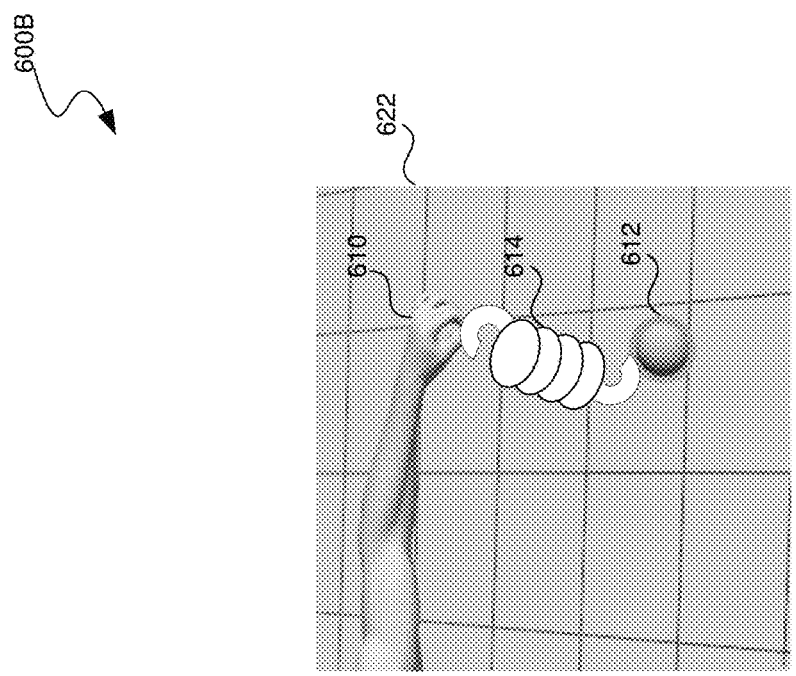
Figure 6B:
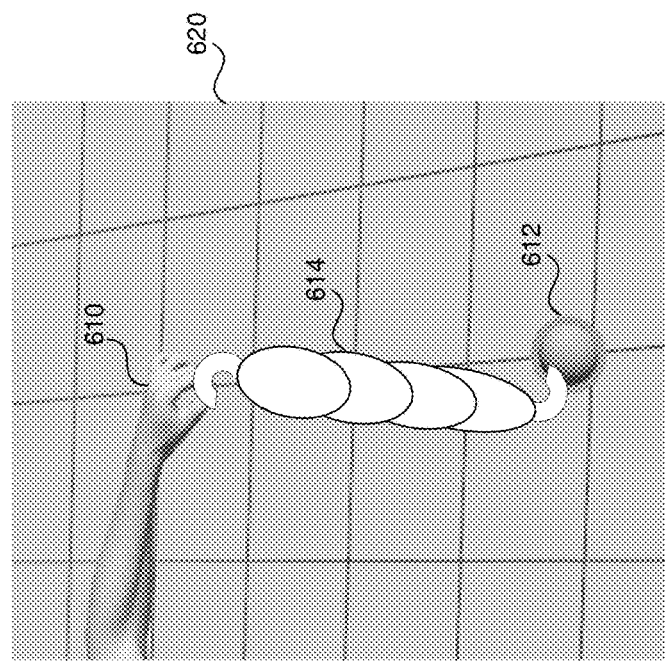
Figure 6C:
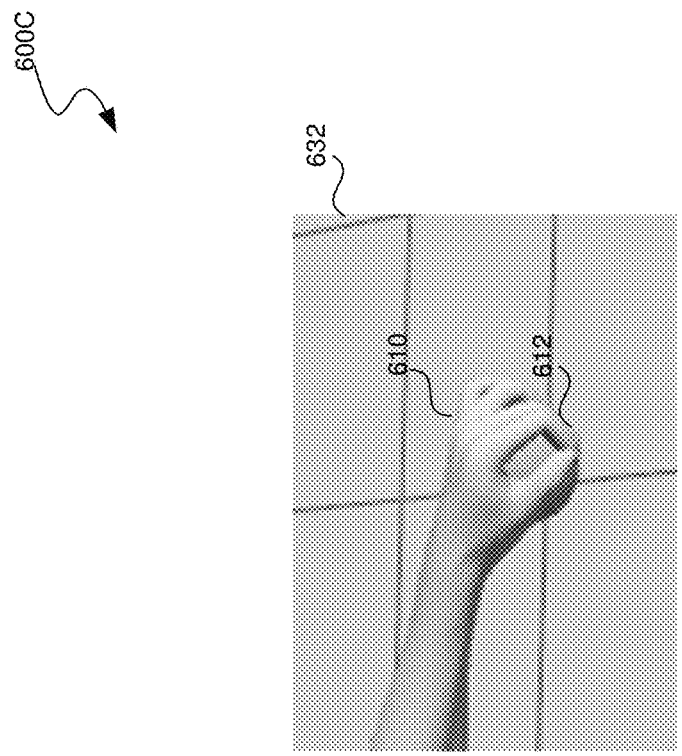
Figure 6C:
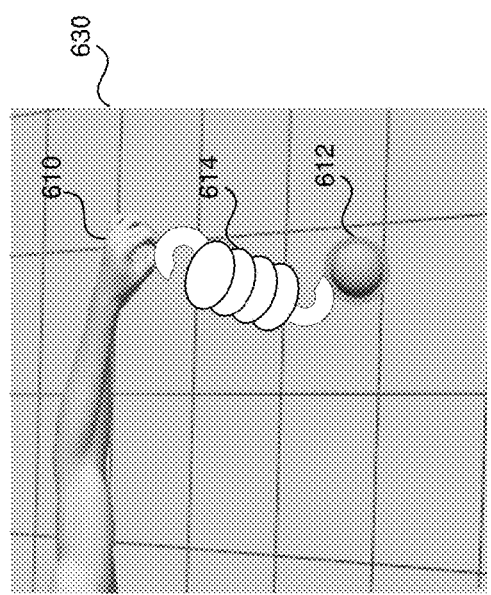

FIGS. 6A, 6B, and 6C are artificial reality diagrams that depict user interactions with a virtual object according to a weight simulation profile for the virtual object. Diagrams 600A, 600B, and 600C include displays 602, 604, 620, 622, 630 and 632, user hand 610, virtual object 612, and conceptual spring 614. Displays 602, 604, 620, 622, 630 and 632 can represent XR motion dynamics at different points in times while a user interacts with a virtual object. Displays 602, 604, 620, 622, 630 and 632 can be time sequenced to represent a motion of user hand 610 while grasping virtual object 612 and the corresponding motion of virtual object 612 in response.

For example, displays 602, 604, 606, and 608 of FIGS. 6A and 6B illustrate user hand 610 grasping virtual object 612 and moving in an upward direction. As the motion progresses, the distance between user hand 610 and virtual object 612 increases, as illustrated by displays 602, 604, 606, and 608. Conceptual spring 614 demonstrates the force applied to virtual object 612 in response to the movement of user hand 610 in the upward direction. The force applied by conceptual spring 614 is delayed in time relative to the movement of user hand 610. Considering a simplified example, the force a spring applies to an object can be defined by the formula: 'F=kx', where 'F' is the magnitude of force applied, 'x' is the amount of distance that the spring is displaced relative to its relaxed (not stretched) position, and 'k' is a spring coefficient or constant dependent on the spring itself. Implementations of the spring dynamics model simulate a damper force for conceptual spring 614, for example to reduce or eliminate oscillating motion of virtual object 612. Any other suitable formula(s) and/or spring dynamic model(s) can be used to calculate the force applied by user hand 610 to virtual object 612 via conceptual spring 614.

Virtual object 612 can be assigned a virtual weight value. Accordingly, physics (e.g., movement vector(s)) can be simulated for virtual object 612 as a function of its weight and the force applied on it by user hand 610/conceptual spring 614. When a weight value for virtual object 612 is non-zero, a minimum amount of force may be required to move virtual object 612. According, some movement of user hand 610 may not move virtual object 612.

The relationship between the location/movement of user hand 610 and the force applied to virtual object 612 by conceptual spring 614 is demonstrated by displays 602 and 604. In display 602, conceptual spring 614 is stretched a small degree, a small force is applied to virtual object 612 given the small 'x' value (e.g., as represented in the formula 'F=kx'), and thus virtual object 612 may not move or may move a small distance/slowly. In display 604, conceptual spring 614 is stretched a larger degree, a larger force is applied to virtual object 612 given the larger 'x' value, and thus virtual object 612 may move a larger distance/faster.

Displays 620 and 622 illustrate the movement of virtual object 612 when a force is applied by conceptual spring 614, such as the force applied with reference to the state of display 604. Between displays 620 and 622, virtual object 612 can move towards user hand 610 given the force applied by conceptual spring 614. After the movement, virtual object 612 is closer to user hand 610, as demonstrated in display 622. This results in conceptual spring 614 returning to a less stretched/relaxed state, causing the force applied to virtual object 612 to reduce (e.g., to zero or a value that maintains little to no movement for the virtual object). In some implementations, a damper force is applied by the spring dynamics model to reduce or eliminate oscillation of virtual object 612.

Diagrams 630 and 632 represent example end states for virtual object 612 after upward movement from user hand 610. For example, virtual object 610 may continue to hang below user hand 610 based on the physics applied by conceptual spring 614, as illustrated in display 630. In another example, when the movement of virtual object 612 falls below a threshold (e.g., the virtual object is at rest) the virtual object may be drawn toward user hand 610 with a steady force/velocity to return to the grasp of user hand 610, as illustrated in display 632.

In some implementations, the spring dynamics model can output a force on the virtual object that simulates multiple springs relative to movement(s) of the user's hand. For example, force components from multiple conceptual springs can aggregate to an overall simulated force applied to the virtual object by movement of the user's hand. In some implementations, the multiple force components can include: a position component applied on the virtual object by a position conceptual spring (e.g., conceptual spring 614 of FIGS. 6A, 6B, and 6C); and a rotation component applied on the virtual object by a rotation conceptual spring (e.g., a coil spring).

Implementations of the position conceptual spring (e.g., conceptual spring 614) can simulate the force applied on the virtual object that defines its position in a three-dimensional environment (e.g., XR environment). Implementations of the rotation conceptual spring (e.g., coil spring) can simulate the force applied on the virtual object that defines its rotational state in the three-dimensional environment. For example, the rotation conceptual spring can take, as input, rotational movement of the user's hand and simulate rotational force on the virtual object. In some implementations, the rotation conceptual spring may not apply force at the virtual object at a fixed point (e.g., may not be affixed to a point of the virtual object like conceptual spring 614). For example, the rotation on the virtual object that corresponds to the user's hand rotation may be applied across a surface/volume of the virtual object.

Similar to the lag implemented via the position conceptual spring, the rotation conceptual spring can apply a force on the virtual object according to the user's hand rotation that causes a delayed rotation of the virtual object. For example, rotation spring value(s) (e.g., one or more spring coefficients 'k') can be applied to the rotation vector(s) of the user's hand rotation to calculate the simulated rotation force applied to the virtual object. The displayed rotation of the virtual object as a result of this simulated rotation force can be based on the virtual object's simulation profile (e.g., simulated weight). For example, the spring value(s) applied to the rotation vector(s) of the user's hand rotation can correspond to the virtual object's simulated weight. In combination, the virtual object's position movement can lag behind the user's hand movements and the virtual object's rotation can lag behind the user's hand rotation.

In some implementations, movement of the virtual object can lag based on the simulated force applied by the position conceptual spring while rotation of the virtual object may correspond to (e.g., may not lag behind) rotation of the user's hand while grasping the virtual object. For example, the movement lag achieved by the position conceptual spring may create the effect of a simulated weight, but some implementations may benefit from a more direct correspondence between the user's hand rotation and the virtual object's rotation. In this example, the rotation vector(s) with respect to the user's hand rotation while grasping the virtual object can be applied to the virtual object (e.g., without use of the conceptual rotation spring).

In some implementations, the spring dynamics model can simulate a force on the virtual object according to a center of gravity for the virtual object and the position/movement of the user's hand relative to this center of gravity. For example, a larger force simulation is calculated in response to user hand movement that moves a greater distance from the virtual object center of mass (e.g., stretches the position conceptual spring further) and a smaller force simulation is calculated in response to user hand movement that moves a smaller distance from the virtual object center of mass. Accordingly, some user hand movement that is relatively close to the virtual object boundary (e.g., defined volume/region of the virtual object) may still be far enough from the center of mass to generate a substantial force on the virtual object. On the other hand, some user hand movement that is relatively far from the virtual object boundary may be close enough to the center of mass to generate a relatively weak force on the virtual object. Other examples of the simulation profile can calculate the force applied to the virtual object according to any suitable point(s) of the virtual object and/or user hand.

Implementations of the simulation profile can comprise modifiable parameters, such as the object's center of mass (e.g., relative point used for force calculation). For example, the modified center of mass may generate a more expected movement/applied force in response to user movement. The modified center of mass may be based on the shape of the virtual object, the virtual weight of the virtual object, or any other suitable factors. The center of mass can be modified by a developer, such as via a user interface (e.g., dragging and dropping the center of mass to a new location on the virtual object), via inputting coordinates that locate the center of mass within the virtual object, and the like.

In some implementations, any suitable parameters of a virtual object's simulation profile can be tuned to simulate weight for virtual objects with different shapes, sizes, weights, and the like. Tunable parameters include spring coefficient(s), damper force(s), virtual weight(s), and/or center of mass location(s). By varying the tuning parameters, a developer can vary simulation profile(s) to simulate force dynamics for virtual objects of different sizes, shapes, weight, etc. to vary the user experience. For example, different virtual objects can be simulated to feel similar to one another, similar virtual objects can be simulated to feel different from one another, or any other suitable simulation can be achieved.

Those skilled in the art will appreciate that the components illustrated in FIGS. 1-5, 6A, 6B, and 6C described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 7:
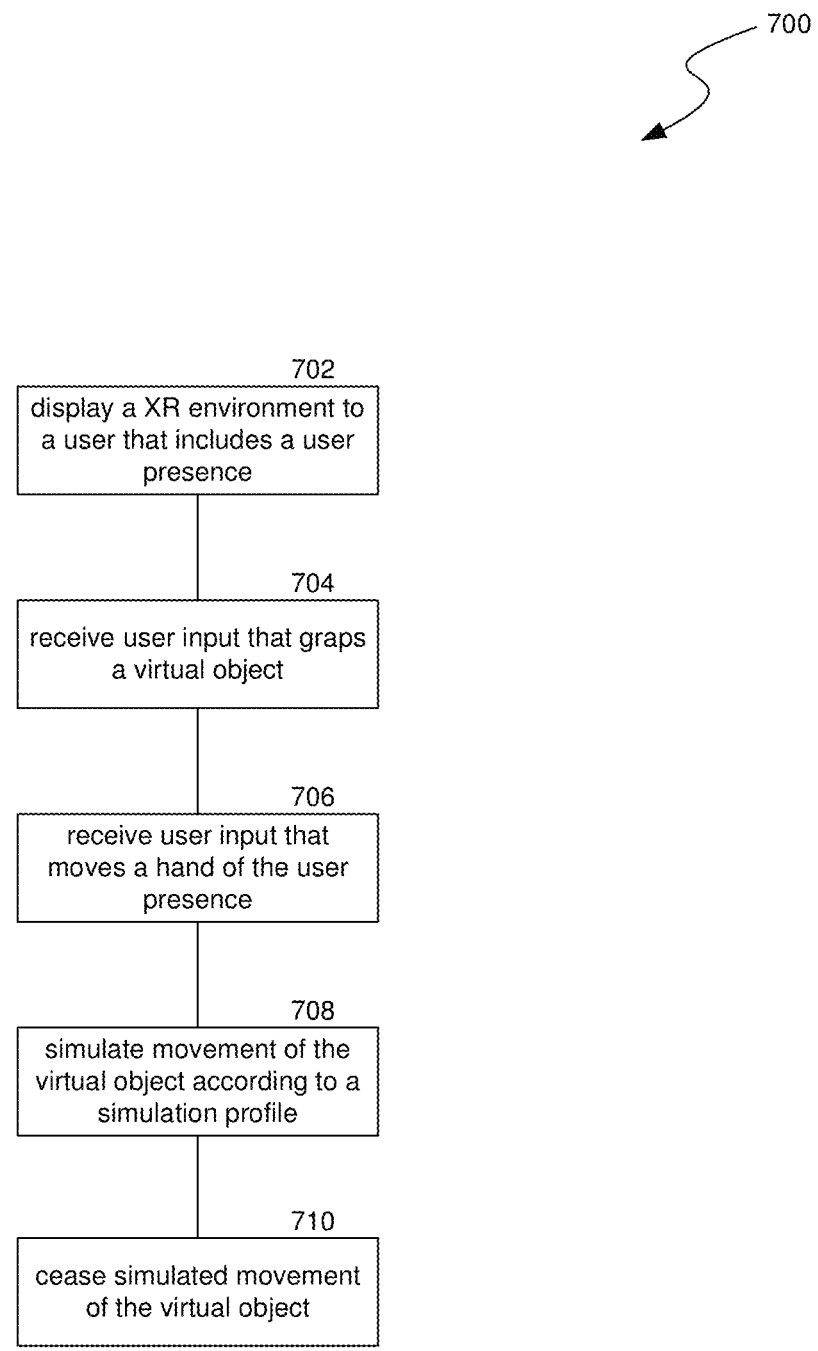
FIG. 7 is a flow diagram illustrating a process used in some implementations of the present technology for simulating weight for a virtual object in artificial reality.

FIG. 7 is a flow diagram illustrating a process used in some implementations of the present technology for simulating weight for a virtual object in artificial reality. Process 700 can be triggered when a user is immersed in an XR environment with a virtual object. Process 700 can be performed at any system configured to processing XR environment visual data and/or display an XR environment, such as XR system(s), server(s), client device(s) (e.g., laptops, smartphones, wearable devices, desktops, smart home devices, etc.), or any other suitable computing system comprising a computer processor.

At block 702, process 700 can display an XR environment that comprises a virtual object and a virtual user presence, where the virtual object comprises a virtual weight. For example, the virtual user presence can interact with the virtual object in the XR environment (e.g., three-dimensional immersive environment). In some implementations, the virtual object comprises a simulation profile that simulates a virtual weight for the virtual object.

At block 704, process 700 can receive first user input at the XR system that grasps the virtual object using a hand of the virtual user presence. For example, a user can provide input via an XR system worn by the user that controls the virtual user presence to grasp the virtual object with the simulated weight. The input can comprise the user's tracked body, such as the user's tracked hand(s) performing a grasp action, or any other suitable XR system input.

At block 706, process 700 can receive second user input at the XR system that moves the hand of the virtual user presence. For example, the user can provide input via the XR system worn by the user that moves the hand of the user's virtual self-presence while grasping the virtual object with the simulated weight.

At block 708, process 700 can simulate movement of the virtual object in response to the second user input. For example, the virtual object movement can be simulated according to a virtual object simulation profile that simulates a virtual weight of the virtual object and a force dynamics model that computes force dynamics for the virtual object in relation to: the virtual weight of the virtual object; and the movement of the hand of the virtual user. In some implementations, the simulated movement of the virtual object lags behind the movement of the hand of the virtual user presence.

In some implementations, the force dynamics computed by the force dynamics model comprises a force applied to the virtual object by the movement of the hand of the virtual user presence to simulate the virtual object movement. The force applied to the virtual object by the movement of the hand of the virtual user presence as computed by the force dynamics model may increase in proportion to a distance between the hand of the virtual user presence and the virtual object. In some implementations, the force dynamics model comprises a spring dynamics model and the force, applied by the movement of the hand of the virtual user presence to the virtual object as computed by the spring dynamics model, simulates a force applied by one or more virtual springs affixed to both the hand of the virtual user presence and the virtual object.

In some implementations, the spring dynamics model comprises at least one spring coefficient that corresponds to the simulated weight of the virtual object. The force applied to the virtual object by the movement of the hand of the virtual user presence as computed by the spring dynamics model can increase in proportion to a distance between the hand of the virtual user presence and the virtual object. For example, the force applied to the virtual object by the movement of the hand of the virtual user presence as computed by the spring dynamics model can be a force vector (e.g., multi-dimensional force vector) that corresponds to Hooke's law.

In some implementations, the spring dynamics model simulates two springs: a position conceptual spring and a rotation conceptual spring. The position conceptual spring can simulate the force applied on the virtual object that defines its position in a three-dimensional environment (e.g., XR environment). The rotation conceptual spring (e.g., coil spring) can simulate the force applied on the virtual object that defines its rotational state in the three-dimensional environment. For example, the rotation conceptual spring can take, as input, rotational movement of the user's hand and simulate rotational force on the virtual object. In some implementations, the rotation conceptual spring may apply force at the virtual object across a surface/volume of the virtual object.

At block 710, process 700 can cease the simulated movement of the virtual object. For example, the second user input can move the hand of the virtual user presence and cease movement of the hand of the virtual user presence. In response, the simulated movement of the virtual object can be ceased after the movement of the hand of the virtual user presence is ceased. In other words, the ceasing of the virtual object's movement can lag behind the ceasing of the hand of the virtual user presence.

In some implementations, the spring dynamics model comprises a dampening force that reduces or eliminates oscillating of the virtual object. For example, a spring dynamics model that lacks such a dampening force may cause simulated oscillating of the virtual object. This simulated oscillating may not achieve the virtual weight effect intended, and thus a dampening force can reduce or eliminate the oscillating to improve the virtual weight simulation.

In some implementations, after simulated movement of the virtual object is ceased, the virtual object is located proximate to the hand of the virtual user presence. For example, the simulated movement calculated by the spring dynamics model may cause the virtual object to cease movement (e.g., rest) near the hand of the virtual user presence, but not in the hand. In some implementations, the simulated movement of the virtual object may include an adjustment that compensates for the gap between the virtual object at rest and the hand of the virtual user presence at rest. For example, the simulated movement of the virtual object can include a movement that draws the virtual object into the hand of the virtual user presence, and, after simulated movement of the virtual object is ceased, the virtual object can be located within the hand of the virtual user presence.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for simulating weight in artificial reality (XR), the method comprising:
    displaying, to a user by an XR system, an XR environment that comprises a virtual object and a virtual user presence;
    receiving first user input at the XR system that grasps the virtual object using a hand of the virtual user presence;
    receiving second user input at the XR system that moves the hand of the virtual user presence; and
    simulating, in response to the second user input, movement of the virtual object in the XR environment according to a virtual object simulation profile that simulates A) a virtual weight of the virtual object and B) a force dynamics model that computes force dynamics for the virtual object in relation to: i) the virtual weight of the virtual object and ii) the movement of the hand of the virtual user,
        wherein the simulated movement of the virtual object lags behind the movement of the hand of the virtual user presence according to the simulation profile.

2. The method of claim 1, wherein the force dynamics computed by the force dynamics model comprises a force applied to the virtual object by the movement of the hand, of the virtual user presence, to simulate the virtual object movement.

3. The method of claim 2,
    wherein the force dynamics model comprises a spring dynamics model; and
    wherein the force, applied by the movement of the hand of the virtual user presence to the virtual object as computed by the spring dynamics model, simulates a force applied by one or more virtual springs affixed to both the hand of the virtual user presence and the virtual object.

4. The method of claim 3, wherein the spring dynamics model comprises at least one spring coefficient that corresponds to the simulated weight of the virtual object.

5. The method of claim 3, wherein the force, applied to the virtual object by the movement of the hand of the virtual user presence, as computed by the spring dynamics model, increases in proportion to a distance between the hand of the virtual user presence and the virtual object.

6. The method of claim 3, wherein the force, applied to the virtual object by the movement of the hand of the virtual user presence, as computed by the spring dynamics model, comprises a force vector that corresponds to Hooke's law.

7. The method of claim 3,
    wherein the second user input moves the hand of the virtual user presence and ceases movement of the hand of the virtual user presence; and wherein the simulated movement of the virtual object is ceased after the movement of the hand of the virtual user presence is ceased.

8. The method of claim 3, wherein the spring dynamics model comprises a dampening force that reduces or eliminates oscillating of the virtual object.

9. The method of claim 1, wherein, after simulated movement of the virtual object is ceased, the virtual object is located proximate to the hand of the virtual user presence.

10. The method of claim 1,
wherein the simulated movement of the virtual object includes a movement that draws the virtual object into the hand of the virtual user presence; and
wherein, after simulated movement of the virtual object is ceased, the virtual object is located within a grasp of the hand of the virtual user presence.

11. A computing system for simulating weight in artificial reality (XR), the computing system comprising:
one or more processors; and
one or more memories storing instructions that, when executed by the one or more processors, cause the computing system to perform a process comprising:
displaying, to a user by the system, an XR environment that comprises a virtual object and a virtual user presence;
receiving first user input at the system that grasps the virtual object using a hand of the virtual user presence;
receiving second user input at the system that moves the hand of the virtual user presence; and
simulating, in response to the second user input, movement of the virtual object in the XR environment according to a virtual object simulation profile that simulates A) a virtual weight of the virtual object and B) a force dynamics model that computes force dynamics for the virtual object in relation to: i) the virtual weight of the virtual object and ii) the movement of the hand of the virtual user,
wherein the simulated movement of the virtual object lags behind the movement of the hand of the virtual user presence according to the simulation profile.

12. The computing system of claim 11, wherein the force dynamics computed by the force dynamics model comprises a force applied to the virtual object by the movement of the hand of the virtual user presence, to simulate the virtual object movement.

13. The computing system of claim 12,
wherein the force dynamics model comprises a spring dynamics model; and
wherein the force, applied by the movement of the hand of the virtual user presence to the virtual object as computed by the spring dynamics model, simulates a force applied by one or more virtual springs affixed to both the hand of the virtual user presence and the virtual object.

14. The computing system of claim 13, wherein the spring dynamics model comprises at least one spring coefficient that corresponds to the simulated weight of the virtual object.

15. The computing system of claim 13, wherein the force applied to the virtual object by the movement of the hand of the virtual user presence as computed by the spring dynamics model increases in proportion to a distance between the hand of the virtual user presence and the virtual object.

16. The computing system of claim 13, wherein the force applied to the virtual object by the movement of the hand of the virtual user presence as computed by the spring dynamics model comprises a force vector that corresponds to Hooke's law.

17. The computing system of claim 13,
wherein the second user input moves the hand of the virtual user presence and ceases movement of the hand of the virtual user presence; and
wherein the simulated movement of the virtual object is ceased after the movement of the hand of the virtual user presence is ceased.

18. The computing system of claim 13, wherein the spring dynamics model comprises a dampening force that reduces or eliminates oscillating of the virtual object.

19. A non-transitory computer-readable storage medium storing instructions that, when executed by a computing system, cause the computing system to perform a process for receiving input in an artificial reality environment using multiple modalities, the process comprising:
displaying, to a user by an XR system, an XR environment that comprises a virtual object and a virtual user presence;
receiving first user input at the XR system that grasps the virtual object using a hand of the virtual user presence;
receiving second user input at the XR system that moves the hand of the virtual user presence; and
simulating, in response to the second user input, movement of the virtual object in the XR environment according to a virtual object simulation profile that simulates A) a virtual weight of the virtual object and B) a force dynamics model that computes force dynamics for the virtual object in relation to: i) the virtual weight of the virtual object and ii) the movement of the hand of the virtual user,
wherein the simulated movement of the virtual object lags behind the movement of the hand of the virtual user presence according to the simulation profile.

20. The non-transitory computer-readable storage medium of claim 19,
wherein the force dynamics model comprises a spring dynamics model; and
wherein a force, applied by the movement of the hand of the virtual user presence to the virtual object as computed by the spring dynamics model, simulates a force applied by one or more virtual springs affixed to both the hand of the virtual user presence and the virtual object.

* * * * *